US006397078B1

United States Patent
Kim

(10) Patent No.: US 6,397,078 B1
(45) Date of Patent: May 28, 2002

(54) COMBINED MOBILE TELEPHONE AND PERSONAL DIGITAL ASSISTANT

(76) Inventor: Young S. Kim, 1612 Corlevia, Los Altos, CA (US) 94024

( * ) Notice: Subject to any disclaimer, the term of this patent is extended or adjusted under 35 U.S.C. 154(b) by 0 days.

(21) Appl. No.: 09/648,353

(22) Filed: Aug. 25, 2000

Related U.S. Application Data

(60) Provisional application No. 60/151,033, filed on Aug. 27, 1999.

(51) Int. Cl.[7] .............................. H04B 1/38; H04M 1/00
(52) U.S. Cl. .......................... 455/556; 455/90; 455/575
(58) Field of Search .................................. 455/556, 553, 455/90, 575, 550, 66

(56) References Cited

U.S. PATENT DOCUMENTS

| 5,719,936 A | * | 2/1998 | Hillenmayer | 379/447 |
| D410,645 S | * | 6/1999 | Wood | D14/138 |
| 6,128,475 A | * | 10/2000 | Wicks | 455/90 |
| 6,149,442 A | * | 11/2000 | Enright | 439/31 |

* cited by examiner

*Primary Examiner*—Vivian Chang
*Assistant Examiner*—James Moore
(74) *Attorney, Agent, or Firm*—Flehr Hohbach Test Albritton & Herbert LLP

(57) ABSTRACT

An integrated mobile phone and personal digital assistant that includes a telephone keypad which folds onto a personal digital assistant screen with the keypad exposed, and slides to expose a portion of the screen, and unfolds to expose the entire screen, thereby allowing both devices to share a single screen for their respective operations.

5 Claims, 5 Drawing Sheets

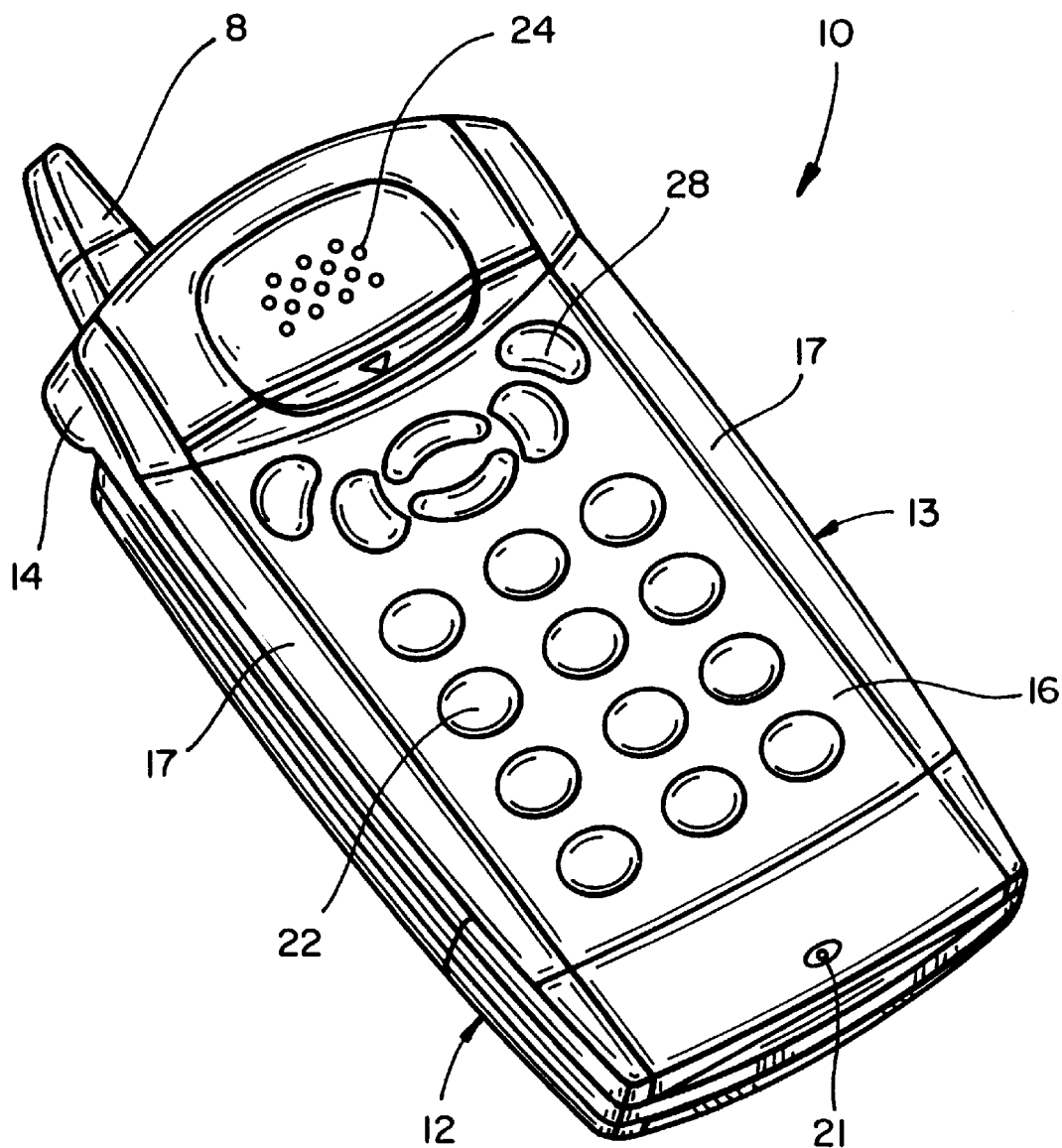
FIG_1

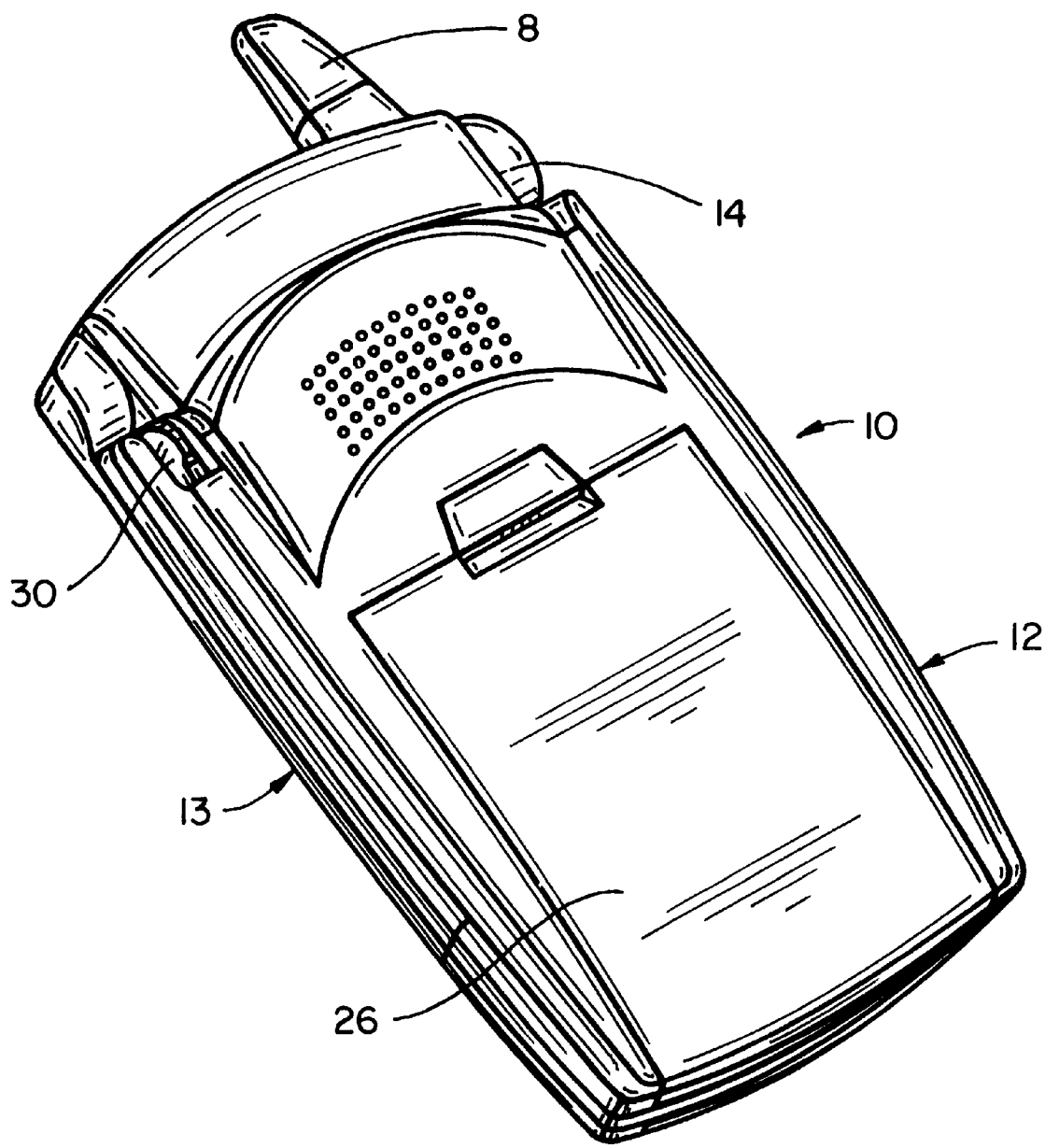
FIG_2

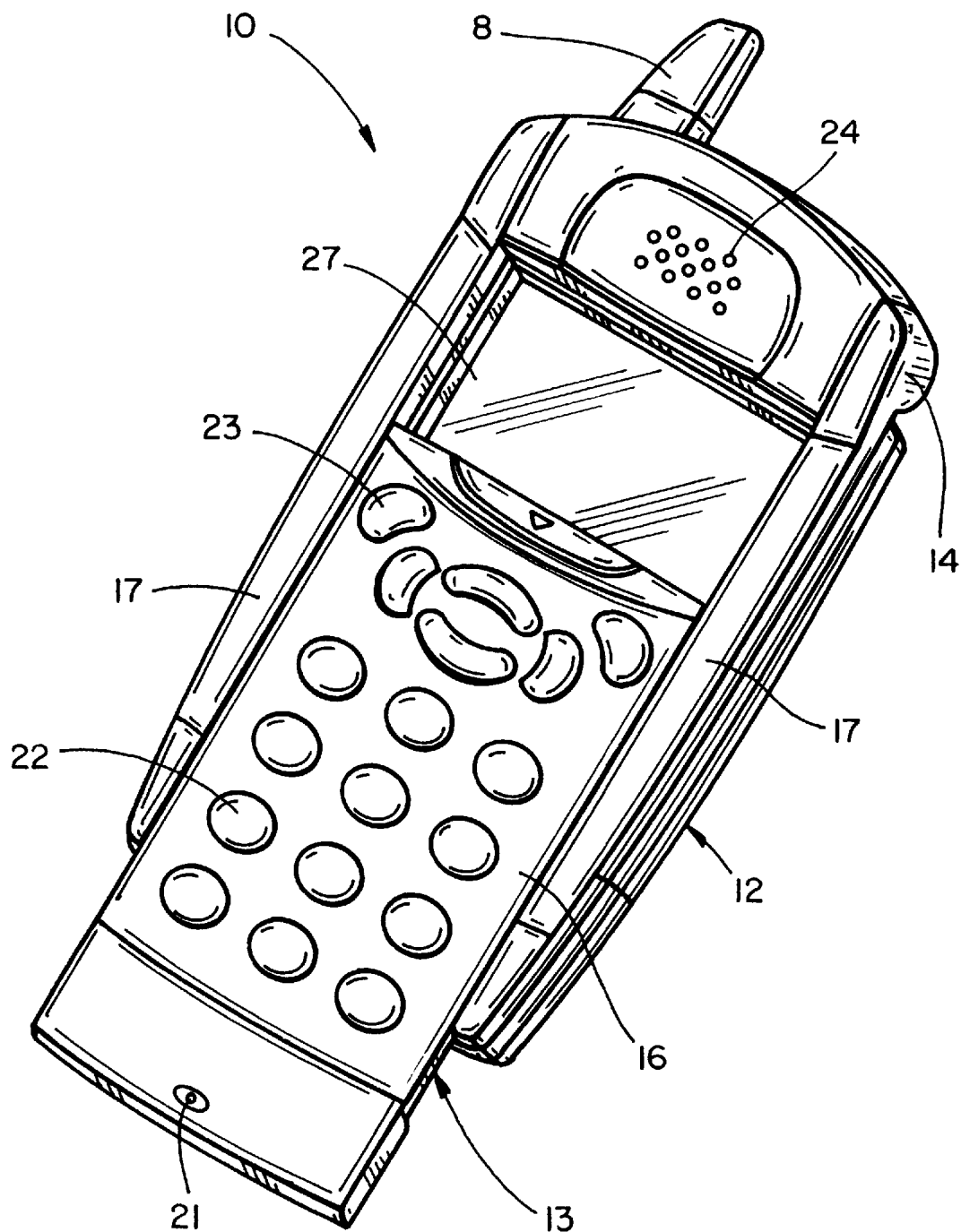
FIG_3

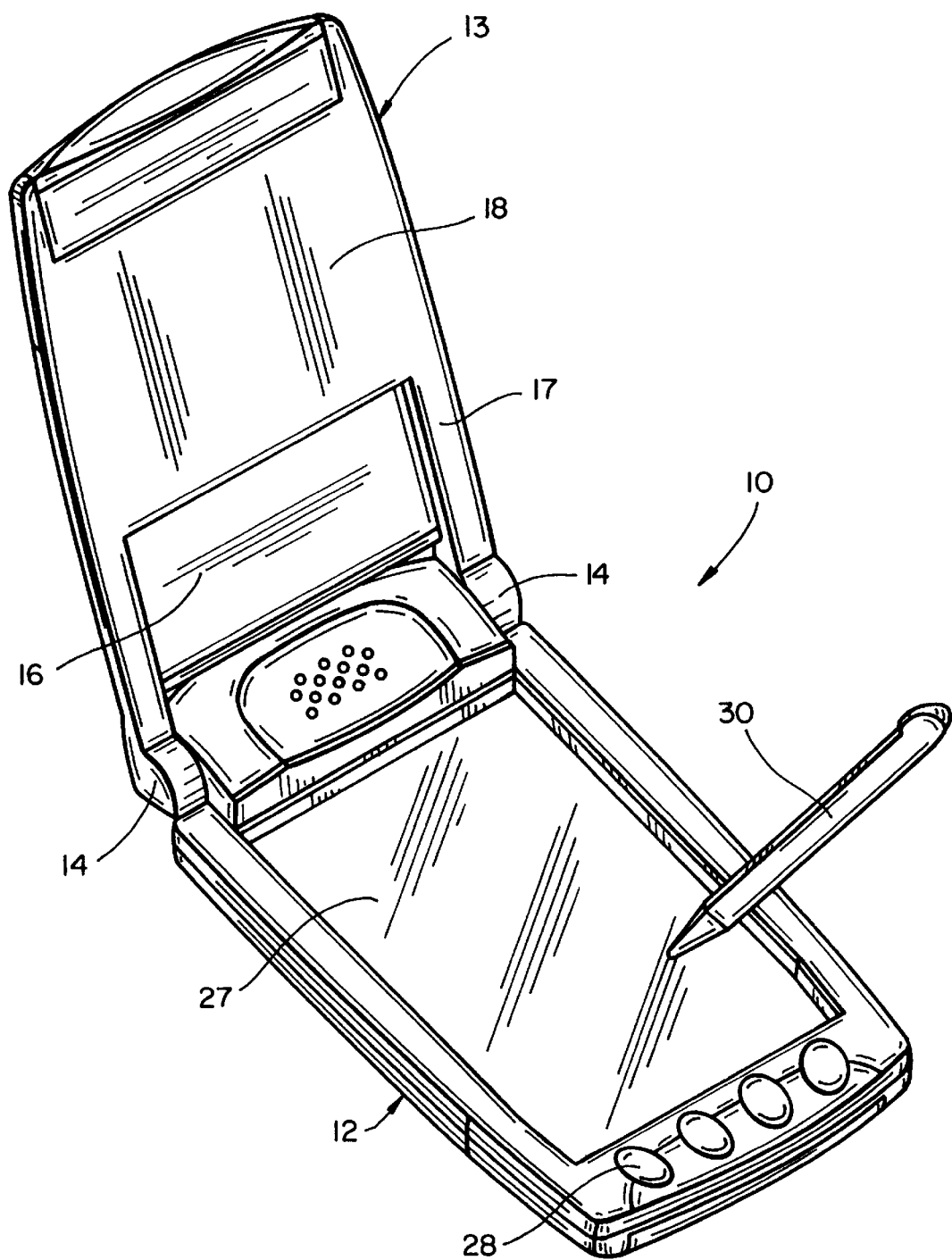
FIG_4

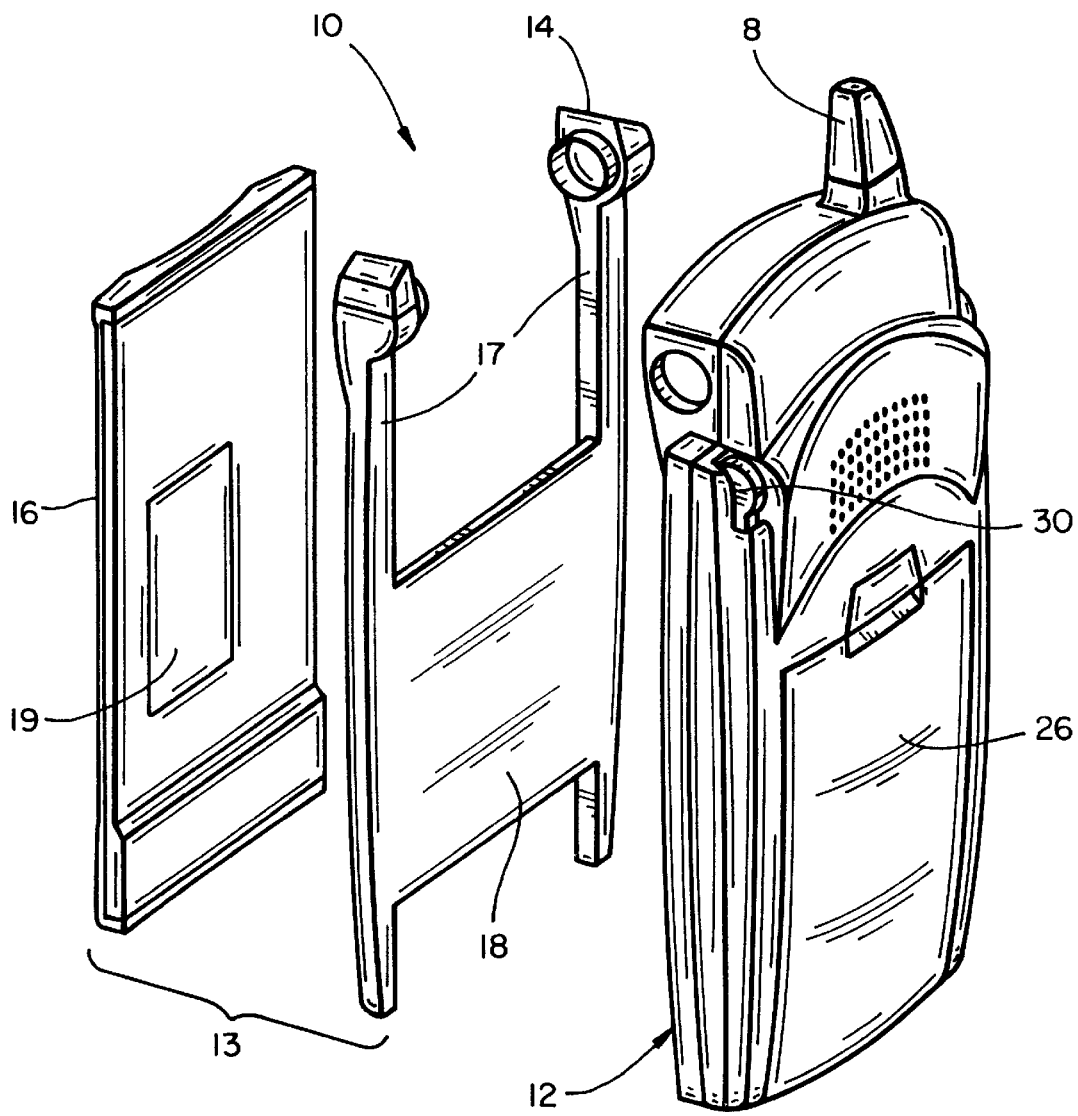
FIG_5

COMBINED MOBILE TELEPHONE AND PERSONAL DIGITAL ASSISTANT

RELATED APPLICATIONS

This application claims priority to Provisional Application No. 60/151,033, filed Aug. 27, 1999, incorporated by reference.

BRIEF DESCRIPTION OF THE INVENTION

This invention relates generally to a combined mobile telephone and personal digital assistant (PDA) and more particularly to a telephone including a slidable telephone keypad which exposes part of the PDA display screen during telephone operation, and which is foldable open to expose the complete PDA display for operation of the PDA.

BACKGROUND OF THE INVENTION

Many individuals carry individual pagers, mobile telephones and PDAs. The name of a contact might be listed in a PDA as well as stored in the mobile phone. Such duplication naturally requires entry of the information multiple times, resulting in an information overlap among these devices. Furthermore, carrying numerous devices is cumbersome and wasteful.

One possible solution to the problem of entering data multiple times is communication ports between the mobile phone and the PDA. Such ports include infra-red and data cable links, although these additions will raise the cost and not solve the problem of having too many devices.

There have been various attempts to combine one or more of the devices into a single unit which is carried by the user. There is a need for a device which combines at least a mobile telephone and a PDA in a compact, easy-to-use manner, and which can make use of the PDA display both during operation of the device as a mobile telephone and as a PDA.

OBJECTS AND SUMMARY OF THE INVENTION

It is a general object of the present invention to provide a compact, attractive, easy-to-use combined mobile telephone and PDA.

It is a further object of the present invention to provide a combined mobile telephone and PDA in which the PDA display is used both during telephone operation and also in the PDA operation.

It is a further object of the present invention to provide a device containing a personal digital assistant and a mobile telephone in which there is a touch sensitive display screen protected by a cover. Along with the cover is a means for attaching the cover to an end of the device and hingably mounting the cover to the device in order to allow rotation away from the display screen. The cover has two parallel spaced rails and a support member including operating electronics, a keypad slidably mounted on the cover between the two parallel spaced rails, facing away from the display screen, and electrically linked to the electronics in the support member. The keypad slides to expose a portion of the display screen before encountering a stop.

BRIEF DESCRIPTION OF THE DRAWINGS

The foregoing and other objects of the invention will be more clearly understood from the description to follow when read in conjunction with the accompanying drawings in which:

FIG. 1 is a perspective top view of the mobile telephone PDA device with the telephone in the folded and closed position.

FIG. 2 is a bottom perspective view of the mobile telephone PDA device shown in FIG. 1.

FIG. 3 is a top perspective view of the mobile telephone PDA device with the keypad slid open to expose part of the PDA display.

FIG. 4 is a top perspective view of the mobile telephone PDA device with the keypad folded in the open position exposing the full PDA display.

FIG. 5 is an exploded perspective view of the mobile telephone PDA device showing the bottom of the keypad and the telephone's electronic support and keypad guide.

DESCRIPTION OF PREFERRED EMBODIMENTS

FIG. 1 is a view of a mobile telephone PDA device 10 in accordance with the present invention. The device 10 includes a PDA base assembly 12 and a cover 13 hinged to the base by hinges 14. The electrical connection (not shown) between the PDA base assembly 12 and the cover 13 exists through the hinges 14. The device 10 determines whether it is being used as a phone or a PDA depending on whether the cover 13 is open or closed, which can be determined by a switch (mechanical, electrical, magnetic, etc.) between the two assemblies 12 and 13 or within the hinges 14.

The cover 13 includes spaced rails 17 and a slidable keypad 16. The keypad 16 includes a microphone 21, number keys 22, and control keys 23. The speaker 24 for the cover 13 is located at an end of the device 10 opposite the microphone 21. The device operates as a phone if the cover 13 is closed and the keypad 16 is slid out along the spaced rails 17. The spaced rails 17 are supported by a support member 18, shown in FIG. 5. The antennae 8 is shown to the side of the speaker 24, although the antennae 8 can be located in any convenient area.

FIG. 2 shows the rear side of the device 10. In this particular embodiment the stencil 30 for the PDA base assembly 12 is located opposite the antennae 8. The stencil 30 is slid out of the PDA base assembly 12 and removed for use. The battery 26 may take the form of alkaline, rechargeable or any other suitable battery and it is located in the rear of the PDA base assembly 12.

FIG. 3 shows the front side of the device 10 with the keypad 16 slid down to partially expose a touch-sensitive screen 27, the device 10 able to receive input from either buttons 23, 22, or 28, or direct contact with the screen 27 surface. The device 10 is therefore configured to operate as a telephone. The spaced rails 17 allow the keypad 16 to slide a limited distance before encountering a stop (not shown) that prevents further movement. The keypad 16 is electrically connected to the support member 18, which includes operating electronics (not shown), by contacts 19 on the rear of the keypad 16 (shown in FIG. 5) and electrical contacts (not shown) on the front of the electrical support member 18. Sliding down the keypad 16 reduces interference between the microphone 21 and the speaker 24 by placing them farther apart from one another.

While in the phone mode, the screen 27 displays information for the user such as signal and battery strength, number to dial, incoming caller ID, phone book, etc. Although the device 10 can operate as a phone without sliding down the screen 27, in the preferred embodiment the screen slides down in order to position the speaker 24 and the microphone 21 relative to a user's ear and mouth. A further option is to disable the activation of the phone until the screen 27 slides down a minimum distance.

FIG. 4 shows the device 10 in PDA mode. The keypad 16 on the cover 13 is slid back into a closed position, covering the screen 27. The cover 3 is then raised from the PDA base assembly 12 in order to expose the full screen 27. The cover 13 rotates about the hinges 14 and can move through a 180 degree arc.

The device 10 operates in PDA mode by using the control buttons 28 and by inputting commands using the stencil 30 via the touch-sensitive screen 27. In one embodiment of the invention, the device 10 is unable to operate in phone mode if the cover 13 is open at all. In another embodiment of the invention the device 10 could still operate in phone mode despite being open, for instance to transmit to a phone/PDA device of another user information within the device's 10 database that is easier to access through the touch-sensitive screen 27.

FIG. 5 shows an exploded view of the PDA base assembly 12 and the cover 13. The keypad 16 maintains contacts 19 on its rear side that provide power and an avenue for communications between the keypad 16 and the device 10. The contacts 19 interface with electrical contacts (not shown) on the support member 18 which further provides an electrical connection (not shown) with the device 10 through the hinges 14. The spaced rails 17 on the electronic support member 18 slidably receive the keypad 16. The hinges 14 on the electronic support member 18 rotatably mount to the socket 40 on the PDA base assembly 12 and electrically connect through the socket 40.

The foregoing description, for purposes of explanation, used scientific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A device combining a mobile telephone and a personal digital assistant including a personal digital assistant and display screen base assembly, a telephone assembly including a keypad, spaced rails slidably receiving said telephone assembly, hinges securing one end of said rails to one end of the base assembly whereby the telephone assembly can be folded over the personal digital assistant base assembly and the display screen so that when it is folded it covers the display screen with the telephone keypad exposed, said telephone assembly adapted to slide along the rails to expose a part of the display screen when the telephone assembly and rails are in their folded position, whereby a portion of the screen is used for telephone communications, said telephone assembly and rails rotating about said hinges to unfold and expose the display screen, whereby the screen can be used as a personal digital assistant display.

2. The device of claim 1 wherein the display screen is touch sensitive.

3. The device of claim 1 wherein the keypad contains a microphone.

4. The device of claim 1 wherein the keypad is limited as to how far it can slide along the rails.

5. The device of claim 1 wherein there is an electrical connection between the telephone assembly and the personal digital assistant base assembly.

* * * * *